US008813133B1

(12) United States Patent
DePrez et al.

(10) Patent No.: US 8,813,133 B1
(45) Date of Patent: Aug. 19, 2014

(54) VIDEO ROTATION INTERFACE

(75) Inventors: Gregory R. DePrez, Highlands Ranch, CO (US); Scott G. Barton, Lone Tree, CO (US)

(73) Assignee: Starz Entertainment, LLC, Englewood, CO (US)

( * ) Notice: Subject to any disclaimer, the term of this patent is extended or adjusted under 35 U.S.C. 154(b) by 1695 days.

(21) Appl. No.: 11/104,307

(22) Filed: Apr. 11, 2005

Related U.S. Application Data

(63) Continuation-in-part of application No. 11/083,437, filed on Mar. 17, 2005, now abandoned.

(60) Provisional application No. 60/554,972, filed on Mar. 19, 2004, provisional application No. 60/554,271, filed on Mar. 17, 2004.

(51) Int. Cl.
*G06F 3/00* (2006.01)

(52) U.S. Cl.
USPC .......... 725/61

(58) Field of Classification Search
USPC .......... 725/25, 27–30, 37–53, 55–65, 75–80, 725/86–89, 96–106, 132–136, 139–147, 725/151–153
See application file for complete search history.

(56) References Cited

U.S. PATENT DOCUMENTS

| | | | | |
|---|---|---|---|---|
| 5,815,145 | A * | 9/1998 | Matthews, III | 725/41 |
| 6,281,940 | B1 * | 8/2001 | Sciammarella | 348/564 |
| 6,865,746 | B1 * | 3/2005 | Herrington et al. | 725/53 |
| 7,669,126 | B2 * | 2/2010 | Morita et al. | 715/716 |
| 2002/0067376 | A1 * | 6/2002 | Martin et al. | 345/810 |

FOREIGN PATENT DOCUMENTS

WO WO 0033570 A1 * 6/2000

OTHER PUBLICATIONS

Star Wars Trilogy (Widescreen Edition with Bonus Disc), Release Date: Sep. 21, 2004.*

* cited by examiner

*Primary Examiner* — John Schnurr
*Assistant Examiner* — Christine Kurien
(74) *Attorney, Agent, or Firm* — Kilpatrick Townsend & Stockton LLP

(57) ABSTRACT

According to the invention, a program delivery system for playing a plurality of video vignettes, which correspond to a plurality of video programs is disclosed. The program delivery system includes a first store, a second store a command signal. In one example, a method for selecting the types and order of video vignettes to be played can be selected. The first store holds a number of programs, where the number of video programs includes a first and second video programs. The second store holds a number of video vignettes that correspond to the number of video programs. The number of video vignettes includes a first and second video vignettes. The first video vignette promotes at least the first video program, and the second video vignette promotes at least the second video program. The command signal causes playing the first video vignette, but switches to cause playing the second video vignette when either a manual command is detected from a user or a triggering event automatically occurs.

20 Claims, 16 Drawing Sheets

VIDEO ROTATION INTERFACE

This application claims the benefit of and is a continuation-in-part of U.S. patent application Ser. No. 11/083,437, filed on Mar. 17, 2005, which is a non-provisional of 60/554,972, filed on Mar. 19, 2004; which are each incorporated by reference in their entireties for all purposes.

This application is related to U.S. patent application Ser. No. 11/104,306, filed Apr. 11, 2005 entitled "CROSS-PLATFORM CONSISTENT VIDEO INTERFACE", which is incorporated by reference in its entirety for all purposes.

BACKGROUND OF THE DISCLOSURE

This disclosure relates in general to video distribution systems and, more specifically, but not by way of limitation, to consumer interfaces for video distribution systems.

Navigation within different types of video players is difficult. Users often cannot understand on-demand services because of confusing interfaces. This confusion dampens adoption of modern video distribution services and decreases revenue because additional content is not ordered. For example, users cannot often find an interesting title that might be available, but is buried too deep in the menus to be uncovered for purchase.

Personal video recorders (PVR), on-demand programming and similar services are giving users the ability to have access to far more programming that was available through the linear schedule. Sifting through all these selections in a meaningful way can be difficult. The trend is to provide even more offerings, which will only make matters worse.

Interfaces to access video content are inconsistent and cumbersome. A user often has to learn two or more interfaces to experience their videos. When they travel to a new location or use a different device, the menus and prompts are completely different. Only the most technically comfortable users are able to easily navigate these different interfaces.

BRIEF DESCRIPTION OF THE DRAWINGS

The present disclosure is described in conjunction with the appended figures.

Figure 1A:
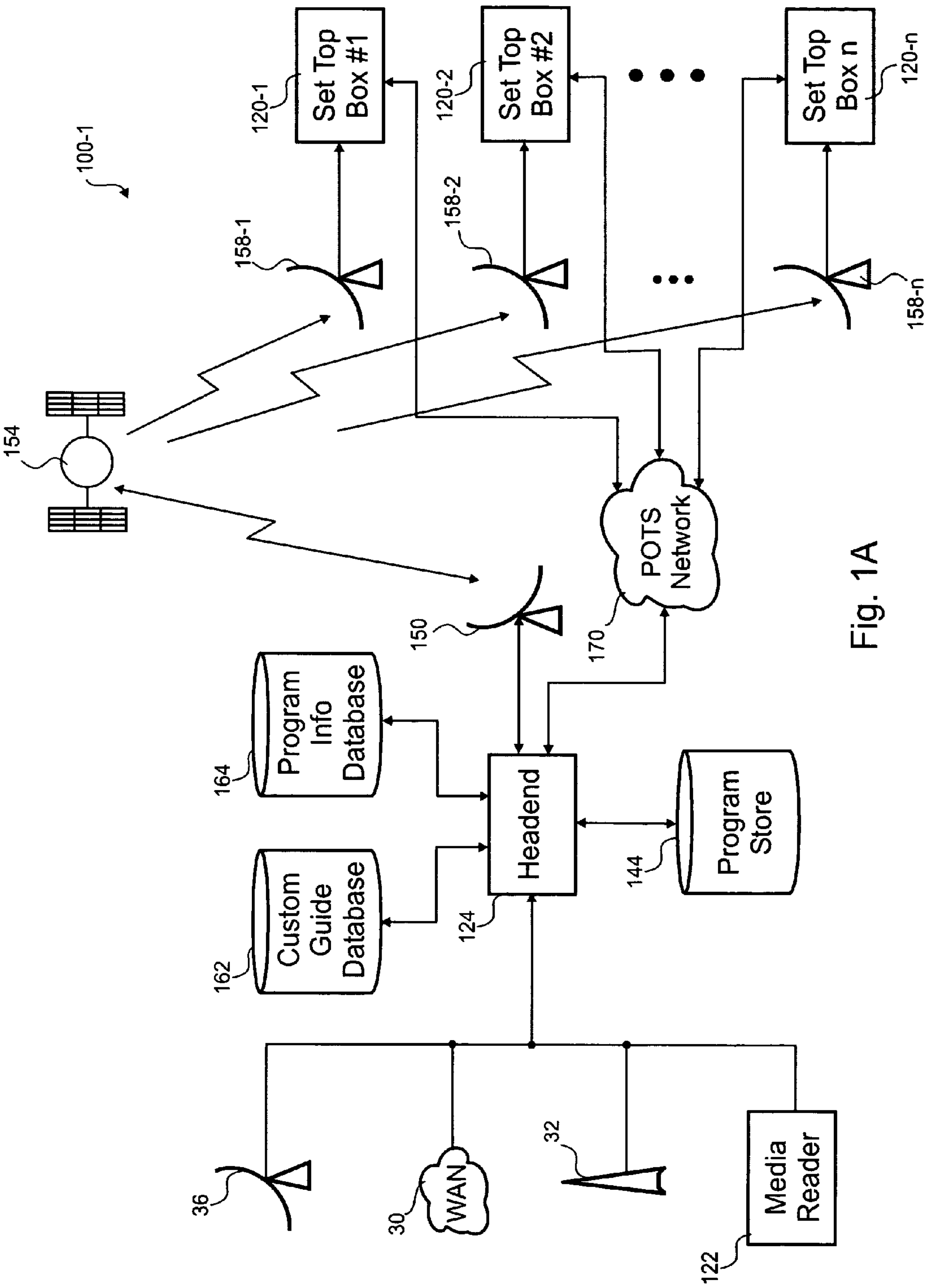
FIGS. 1A and 1B are block diagrams, depicting embodiments of a program delivery system using satellite transmission or the Internet to each set top box.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment, the invention relates in general to on screen navigation of video programming, including pay per view, linear, video on demand ("VOD"), near VOD (NVOD), and subscription VOD ("SVOD") programming. Navigation could occur in a variety of end user display platforms and devices, including without limitation television, computer, wireless telephone, personal media player, set top box, personal video recorder (PVR), video cassette recorder (VCR), personal digital assistant, cellular phone, cable television, satellite television, IP TV, wireless video distribution services, portable game players, in-car video system, and/or other devices that record and/or display video.

In one embodiment, television viewers are offered a rotation feature for video programs that allows viewing of condensed vignettes (e.g., theatrical trailers, teaser clips, video excerpts, previews, images and/or other advertisement) for programs. The vignettes can be available for linear programs, on-demand programs (e.g., VOD, SVOD, NVOD, wireless broadcast, and Internet downloads), PVR stored programs, DVD programs in a multi-disk player, and/or any other programs available to a video player. In one embodiment, the various vignettes rotate through a preview window where they are played automatically. Advancing from one vignette to another may occur automatically or manually. Where the advancing is automatic, it could be after a set time period (e.g., 5 sec., 15 sec., 30 sec., 1 min., 3 min., or 5 min.) or whenever the vignette finishes playing. Another embodiment allows scan through a particular video such that a clip from each chapter is played in a serial fashion. When advancing from one vignette to another is programmed to occur manually, the current vignette would play to its end unless and until the viewer manually selects playback of the next vignette.

The parameters of the content shown in the rotation feature could be selected by the viewer, and could include category of content (scan all current linear programs or all VOD or SVOD programs), content provider (scan all available Starz® or channel 16 movies), theme or genre (scan all available love stories), talent (scan all available John Wayne movies) or other parameters selected from an available list or input manually by the viewer. The viewer could program the duration of playback of each vignette before the rotation feature continues to the next vignette. The viewer could manually stop the advance of the rotation feature by choosing to play the video program corresponding to the vignette or could pause the rotation to get more information on the video program. Some embodiments could allow the user to order the vignettes in the playback lineup by prioritizing search criteria, dates, alphabetical ordering, etc. Additional information could include reviews, box art, summaries, actor and producer information, longer or shorter vignettes, bonus material, "making-of" documentaries, stills or animated icons for the chapters in the program, etc. The rotation feature could be accompanied by an on-screen graphical representation of the viewer's progress through the available video programs. The rotation feature could include video programs for which the viewer is a non-subscriber, in which case the viewer would see upsell messages or auto provisioning screens if the viewer selects a video program to which he or she is a non-subscriber.

Figure 2:
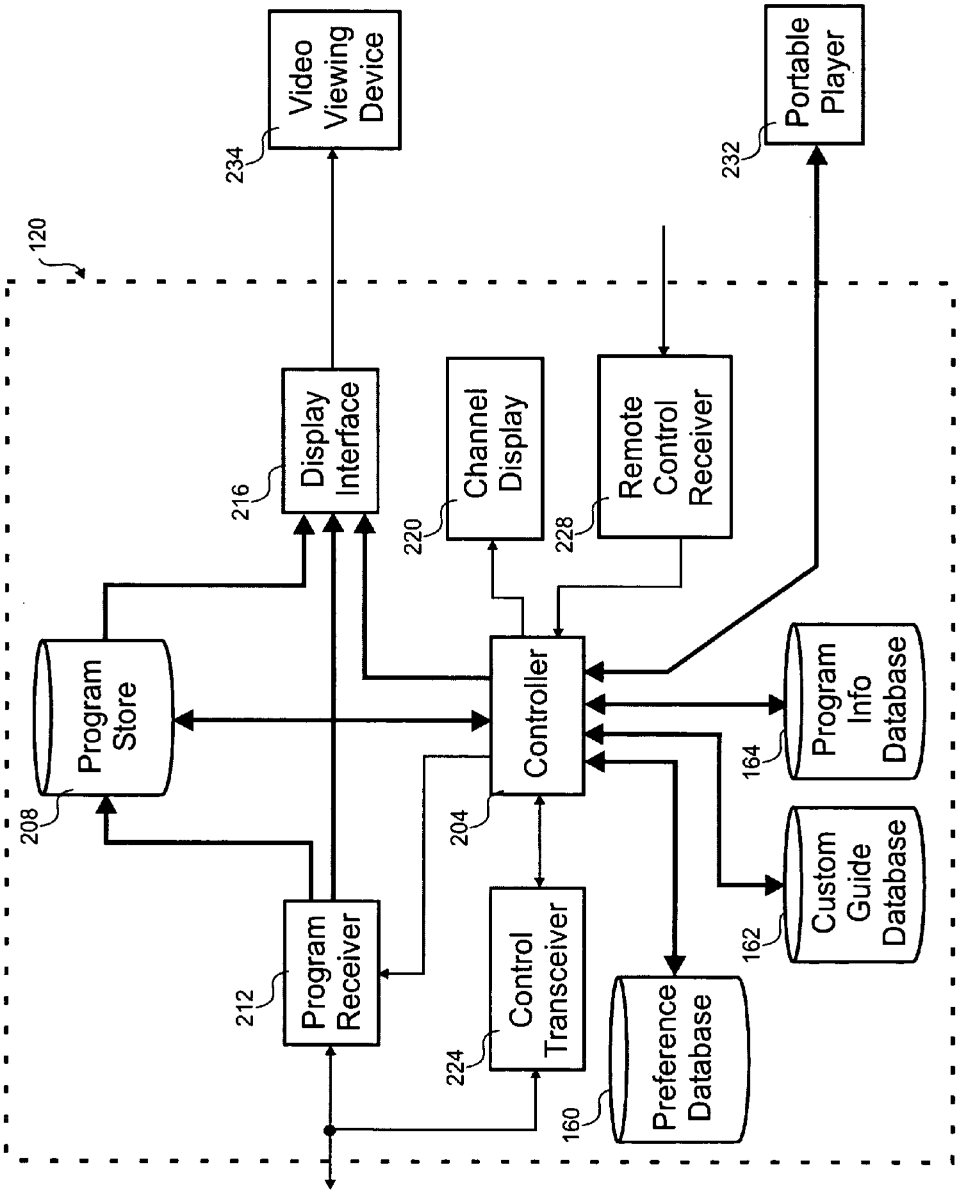
FIG. 2 is a block diagram illustrating an embodiment of a set top box that stores guides, program information, programs and preferences locally.

Referring first to FIG. 1A, a block diagram is depicted of an embodiment of a program delivery system 100 using satellite transmission to each set top box 120. As used in this application, a set top box 120 is any video playback device that may or may not have an integral display. The content is relayed by satellite 154 to satellite receivers 158 respectively coupled to each set top box 120, but other embodiments could use wireless, HFC, IP transport, optical fiber, VDSL, and/or power lines to distribute the content. This embodiment has a return data channel through the plain old telephone system (POTS) network 170, but other embodiments could use a WAN, the Internet, a satellite uplink, a cellular data network, a wireless network, HFC return path, etc. Each set top box 120 in this embodiment includes an interactive program guide (IPG) and preference information and store for programs as shown in FIG. 2 discussed below. Some legacy set top boxes with limited memory and/or processing capacity could only include guide information without the ability to store programs or preference information.

A content provider (not shown) communicates via a satellite dish 36 with the program delivery system 100. Other embodiments could have content providers (not shown) that could also use a wide area network (WAN) 30, a terrestrial antenna 32, a media reader 122, and/or other distribution techniques. The WAN 30 could be a private or public network. Distribution on a public network, such as the Internet, could be protected by encryption and/or virtual private network (VPN) techniques. The terrestrial antennae 32 could accept content broadcast by local stations, sent by microwave link, or other wireless techniques. Any type of portable media could be read by various embodiments of the media reader 122. For example, a media reader 122 could read content from magnetic tape, film, optical disk, flash drives, hard drives, magnetic disks, holographic media, etc.

Some programs are relayed in real-time, while others are stored in a headend program store 144 for later delivery. For example, a local network channel could be received on the terrestrial antennae 32 and coupled to the transmission system for immediate delivery to the set top boxes according to a linear schedule. Some programs could be held in the headend program store 144 for viewing in a linear schedule, on demand and/or as a club program. In another embodiment, programs could be distributed to a neighborhood store for distribution according to a linear schedule, on demand and/or as a club program.

In one embodiment, a number of neighborhood stores could be distributed to neighborhood nodes in a larger metropolitan area such that there are sufficient singlecast channels between each neighborhood store and cluster of set top boxes 120. On a singlecast channel, the user can control playback of content residing on the neighborhood store. The programs could be video on demand (VOD), subscription video on demand (SVOD) club programs, network-based personal video recorder (NPVR) or programs from the linear schedule recorded for the user.

The program information database 164 has program descriptions, ratings, advertisements, reviewer rankings, reviews, video vignettes of various sizes, photos or images, genre or theme information, actors, program length, actor and director information, version availability, information on bonus material, schedule times, pricing, and any usage limits for the content available to the program delivery system 100. The program information database 164 could be populated by the content provider and/or a third party that gathers this type of information. Some embodiments could download relevant portions of the program information database 164 to each set top box 120 for browsing.

The video vignettes could be available for some or all linear programs, on-demand and stored programs. For a particular program, there could be different length video vignettes (e.g., 5 sec., 15 sec., 30 sec., 1 min., 3 min., or 5 min.), for example, a movie might have a 5 second teaser clip and a 30 second theatrical trailer. A series of programs might have a single video vignette for use with multiple episodes. Some embodiments could create a video vignette from a stored version of the program automatically or could stream a clip from a network connection. Some embodiments could keep video vignettes stored at the user location for the most likely to be viewed programs in general across a number of users or based upon knowledge of viewing preferences for a viewer or account. In some embodiments, the user might be able to specify the encoding quality and length of video vignettes to use. For example, for a low capacity video player, only 5 second clips might be specified with a 150 Kbs codec. Some embodiments may allow video vignettes that are just slide shows of stills from a program. In one embodiment, the video vignettes are not stored at the user location, but streamed there upon demand.

Also, a web site could show this information in addition to making it available through the set top box 120. Programs could be selected for recording and subscriptions (or other club memberships) could be ordered through the web site. One embodiment could formulate the guide screens with information from the program information database 164 for singlecast to a particular user or set top box 120. Program information for on demand offerings are also included in the program information database 164.

In some embodiments, the user is allowed to watch an on demand program during a time window. The program information database 164 could store time window information. Where a particular program is available in the linear schedule and on demand, the program information database 164 could be updated such that this is reflected on the menus for users who have these two formats available.

The program information database 164 further holds various theme categorizations such as genre, style, mood, program length, content rating, language, reviewer ranking, availability of subtitles or closed captioning, actors, directors, studios, release year, first run or repeat, cost of the view, content provider category (pay programming, free program, network offerings, cable offerings, premium channel offerings, etc.), and/or other defining attributes. These categorizations can be used when determining similar material to present to a viewer. Some embodiments allow selecting these theme categorizations and other information in the program information database 164 as part of a search string to filter the various video programs into more manageable searches.

This embodiment also has a custom guide database 162, which stores IPG profiles to characterize other types of IPGs. Those IPG profiles allow the set top boxes 120 to closely emulate operation of the IPGs for other video players with the present set top boxes 120. When a particular user operates a set top box 120 it can be configured to operate its IPG like another video player the user is accustomed to using by applying the relevant IPG profile. Various IPG profiles can be downloaded to a particular set top box 120 once it is requested a first time. The set top box 120 could reconfigure itself on demand according to the IPG profiles.

Figure 1B:
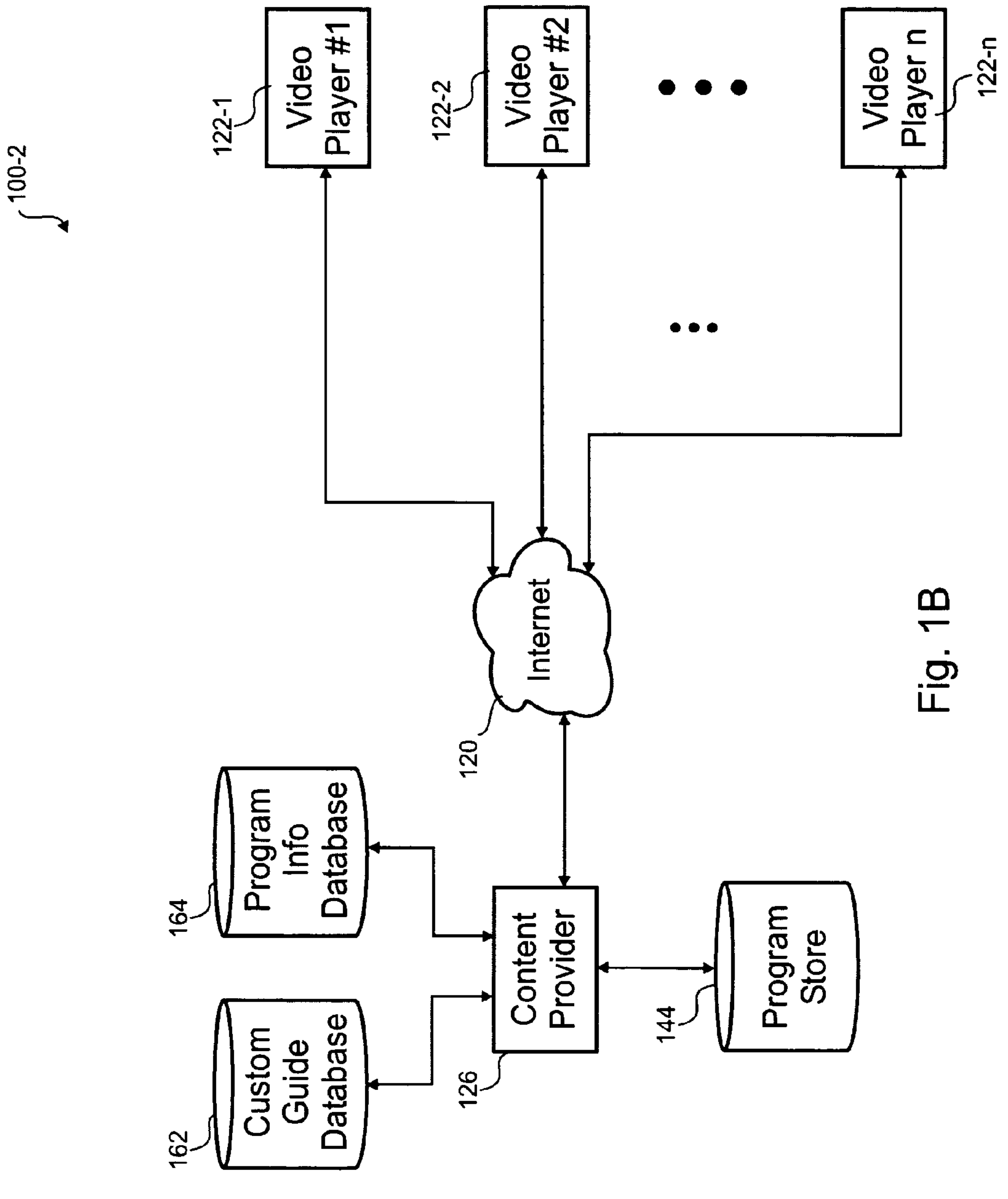

With reference to FIG. 1B, a block diagram is depicted of another embodiment of a program delivery system 100 using network transport to each video player 122. The video player 122 could include, without limitation, a television, a computer, a wireless telephone, a personal media player, a set top box, a personal video recorder (PVR), a video cassette recorder (VCR), a personal digital assistant, a cellular phone, a portable game players, anin-car video system, and/or other devices that record and/or display video. The network transport could be over the Internet 120, wireless or any other data transport medium. In this embodiment, a content provider 126 with a program store 144, a custom guide database 162 and a program information database 164 sends programs to video players 122. The video players 122 have the ability to display an IPG that is streamed or hosted by the video player 122. The video player may rely upon the content provider 126 for the information in the three databases 144, 162, 164 or might download and store a subset of this information.

Referring next to FIG. 2, a block diagram illustrating an embodiment of a set top box 120 that stores guide information, programs and preferences locally is shown. This embodiment receives content and control information over a common conduit, such as an optical fiber, wireless antenna, network connection, satellite dish, power line carrier current modem, VDSL line, and/or coaxial cable. The set top box 120 in this embodiment, which could be a video player 122 in other embodiments, has a program store 208 that uses a hard drive or other storage medium, such as an optical disk, flash memory, SRAM, removable disk, and/or magnetic tape. Included in the set top box 120 are a controller 204, a program store 208, a program receiver 212, a display interface 216, a channel display 220, a control transceiver 224, the preference database 160, the custom guide database 162, and the program information database 164. In various embodiments, the set top box 120 could be combined with other equipment such as a television, a computer, a tuner, a home gateway, a digital music player, a personal video recorder, a portable or mobile video device, etc.

The program receiver 212 tunes to one or more program streams to display and/or record them. With proper authorization, the program receiver 212 can tune to hidden channels to receive club programs that are not viewable before storage. The hidden channel could be an encrypted MPEG channel or an IP data delivery channel. In various embodiments, the hidden channel could use a terrestrial broadcast, cable television, DBS satellite, and/or other transport format.

Presentation of live or recorded programs is done by the display interface 216, which is coupled to a monitor, plasma or LCD panel, projection system, or other video viewing device 234. The remote control receiver 228 receives keystrokes from a remote or other input device. Although some of the embodiments discuss the use of a remote control for activating certain functions, it is to be understood that other embodiments may include alternative methods for activating those functions. For example, voice activation, among other alternatives, may be used for such activation. The channel currently being played is shown on the channel display 220, which could also appear superimposed on the display.

The control transceiver 224 receives and sends control information. Information for the program information database 164 is received by the control transceiver 224 and could be customized by the delivery system 100 for a particular set top box 120 and/or user account. Information in the preference database 160 along with billing and other information is passed by the control receiver to the network node and/or headend 124 in some embodiments. Programs could be passed through the control channel for storage in the program store 208 in addition to passing through the more typical path of the program receiver 212.

The program store 208 could be a video cassette recorder, a digital tape recorder, a hard drive, solid state storage, an optical drive, or other known storage media. The storage media could be removable or non-removable. The storage device could be external to the set top box 120 and coupled thereto with a dedicated cable, wireless transceiver, and/or packet switched network. In some embodiments, the program store 208 could be, for example, in a residential gateway, in another computer on the network, in a network storage device, or in a storage device peripheral coupled to the set top box 120. In one embodiment, programs are received in a compressed and/or encrypted format and stored on the program store 208. As or while the program is being played the compression and/or encryption is removed.

Recordings are stored in the program store 208. Typically, the program store 208 has a subset of programs available from the headend store 144. Club memberships, subscriptions, on-demand programs purchased, and time-shifted linear scheduled programs all can affect what could be held in the program store 208. Digital rights management (DRM) may be enforced by the controller 204 to regulate access to stored programs either on the set top box 120 or on a removable or separate store. Some embodiments allow offloading programs from the program store 208 in digital form for playing on other set top boxes 120, computers, DVD players, and/or portable media players.

The program information database 164 holds program information for the programs available from the set top box 120. The stored information is typically a subset of that stored proximate to the headend 124. Tailoring of the program information database 164 could be influenced by preferences and subscribed services.

Subsets of the program information database 164 relevant to the program(s) available to the set top box 120 and the preference database 160 relevant to the user could be placed on the removable media or portable player to allow the guide customizations to flow to that portable device. For example, this embodiment includes a portable player 232 that could be connected to the set top box 120 with a cable, docking station or wireless interface. When coupled together, the preference database 160 and program information database 164 portions relevant to the portable player 232 could be loaded onto smaller versions of these databases within the portable player. The thematic link would be maintained on the portable player 232 using the selections currently available on the player, which would include stored programs and programs available for download or within a linear schedule of programs. Programs may be available on demand to the portable player 232 with a wired or wireless data port or may be available from broadcast via a satellite or terrestrial broadcast. The portable player 232 could be a personal video player, a wireless phone, a satellite radio, a car video system, etc.

The presentation of information from the set top box 120 can be customized for particular set top boxes 120, households and/or users. A preference database 160 stores customization parameters to facilitate the personalization of the set top box interface. The personalization can be per user, household or set top box 120 under the direction of the user. Information such as viewing habits, preferences, menu customizations, favorite shows, programs scheduled for recording, channel nicknames, parental controls, IPG profile, IPG customizations etc., can be stored in the preference database 160 for use by the program delivery system 100. For example, the program delivery system 100 can customize the menus singlecasted to a user based upon information in the preference database 160. The preference information can be passively gathered by tracking users and/or actively gathered by the user answering questions. The preference database 160 also stores information used to screen or filter which programs are made available or presented by the set top box.

Similar to the remote version, the custom guide database 162 stores IPG profiles likely to be used by the set top box 120. These IPG profiles could be a subset of those available at the headend 124. Some embodiments of the set top box 120 only store one or two IPG profiles and download any additional profiles as needed. Typically, a default IPG profile is shipped with the set top box 120 and is used unless another profile is preferred by the user.

Operation of the set top box 120 is managed by the controller 204 with use of supporting software and/or hardware. The program information database 164 and preference database 160 are used by the controller 204 to present menu screens according to the current IPG profile and filter club programs for the users of the set top box 120. Some embodiments of the set top box 120 customize the current IPG profile according to the user(s) interacting with the set top box 120. Biometric recognition, such as face recognition, voice recognition or keystroke recognition, could be used to determine the user. Alternative embodiments could augment or replace the automatic recognition with a screen prompt or a button on the remote. A button or switch on the remote could be assigned such that each user could indicate his or her presence. Once the identity of the viewer is known, the set top box 120 actively or passively updates the preferences for the viewer in a multiple viewer household. Other embodiments could merely have a single set of preferences for all possible viewers and not try to resolve the particular viewer.

Figure 3A:
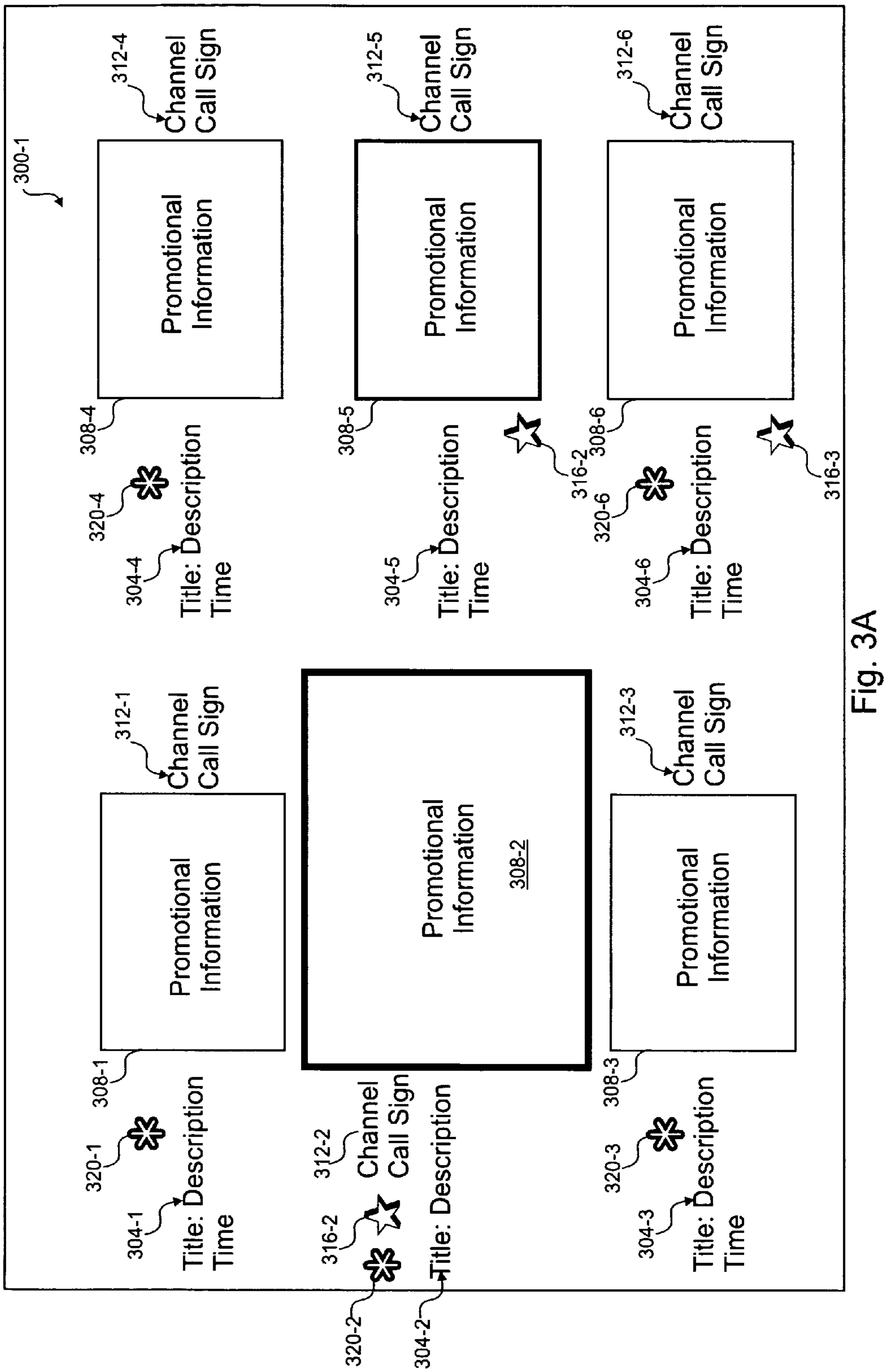
FIGS. 3A and 3B are screen shots depicting embodiments of a rotating video interface showing promotional information for a number of programs in a mosaic.

Referring next to FIG. 3A, a screen shot depicting an embodiment of a rotating video interface 300-1 showing promotional information 308 for a number of programs is shown. The rotating video interface 300 could display the programs on the local program store 208, the SVOD selections available, the VOD selections available, on-demand programs, linearly scheduled programs, or a mix of these types of programs. Any rotating video interface could be customized according to preferences for the user, the context of navigation and theme of most recent program. For example, the six depicted programs in the mosaic could be from channels the user specified in their profile or could be programs the set top box 120 has determined the user will enjoy. By viewing the rotating video interface 300-1 with the six program zones of this embodiment, the user can quickly determine a program to play. Other embodiments could have a rotation interface showing one through sixty-four zones that could be rotated through.

Using keys on the remote or by automatic progression, the focus can move to the promotional information area 308-2, which is highlighted in this embodiment. The promotional information could include a video vignette, a video vignette with audio accompaniment, an audio clip, a still image with audio accompaniment, a slide show, an animation, an animation with audio accompaniment, a still image, bonus material, director commentary, a number of still images, and/or a number of still images with audio accompaniment. When a particular zone is in focus, any sound for that image could be played while the sound for the other zones could be muted.

Moving focus to a particular zone may highlight that promotional information 308, enlarge the promotional information 308-2 and provide enhanced summary information 304 for that program. For example, a larger version of the video vignette 308 could be played when that zone is in focus. In some embodiments, the image 308 may switch between two possibilities when that zone is in focus. For example, a static image could be shown until that zone is brought into focus whereafter a moving image or animation is presented.

By pressing a button on the remote while focus is on a particular image 308 or zone, the corresponding program can be viewed or downloaded for later playback. A menu page or menu overlay may be activated by that button to allow playing a program, subscribing to a club or subscription service for that program, authorizing a one-time fee to view the program, playing or deleting a stored program, etc. In some embodiments, moving focus to a particular zone presents buttons on the thematic menu screen corresponding to some of these options in lieu of a separate menu page or menu overlay.

The promotional information 308 and/or program descriptions 304 may be made general to a number of programs. For example, a clip 308 for a series of programs could be reused for each program in the series where the program descriptions 304 could change for each episode. In some embodiments, there may be default promotional information 308 and/or program descriptions 304 for a particular channel such that if no specific information were provided the default promotional information 308 and/or program descriptions 304 could describe the particular channel.

The six zones of the video rotation interface 300 each describe a particular program with summary information 304, promotional information 308, and content provider information 312, such as a channel call sign, channel name and/or content provider name. The program could be an audio or video program. Summary information 304 is provided for each program and includes: a title, a description, a program length, a start time for programs in the linear schedule, actors, a content advisory rating, a reviewers rating, and/or other information.

Each zone has promotional information 308 which could be a static or dynamic image, such as a picture, advertisement, video clip, audio clip, slide show of images, animated image, etc. This promotional information 308 is stored in the local program information database 164 for this embodiment, but could be stored remote to the user location in other embodiments. Where the program associated with the zone is a currently playing program, a live view of that program could be displayed. Where there are not enough tuning resources to dedicate a tuner for each currently playing program, the tuner resources could cycle through the images of the live programs such that each flashes a static image or small clip before the tuner resource is switched to the next zone.

Each zone also has content provider information 312. In this embodiment, the content provider information includes a channel and call sign associated with the content provider, but could also include a logo, a language, a nationality, etc. Where all zones are associated with a particular channel, the content provider information 312 could be removed.

Some zones in the depicted embodiment of the video rotation menu 300 further include a notification symbol 316. A notification symbol 316 indicates that the program associated with that zone is immediately available for playback with full or partial control of the playback. Those without the symbol are part of the linear schedule and can be watched while the program is broadcast, but are not currently stored so as to allow rewinding, etc. The notification symbol 316 could have a number of variants to indicate the type of program (e.g., stored program, SVOD or club program, VOD program), limited availability of the program, a charge is associated with viewing the program, the content provider associated with the program, etc. The notification symbol can be a static icon or an animated icon in various embodiments.

Some programs show a thematic link 320 in their zone. The thematic link allows finding programs similar to the program in that zone. A theme, channel and/or content provider can be used in a further search for programs after activation of the thematic link 320. For some programs, such as the program associated with zone five, a thematic link 320 is not available. A particular channel or content provider may elect to not provide a thematic link 320 or insufficient information is available to determine a list of alternative programs such that a thematic link 320 would not appear.

Although this embodiment only shows six zones, the rotation interface 300-1 could rotate through a much larger list where only the six nearest in the listing are shown on the screen at one time. The mosaic would add a new program as another is removed as the focus progresses through the listing. Some embodiments could indicate where the current focused zone is in the list, for example, "7/28" to indicate that this is the seventh program in a list of twenty-eight.

Progression through the list of programs could be automatic and/or manual. In automatic mode, the progression is on a timer or based upon the playtime of the promotional information 308. The user can override the automatic progression with the remote or other control means, for example, the up/down controls on the set top box 120 could move the focus between zones.

Figure 3B:
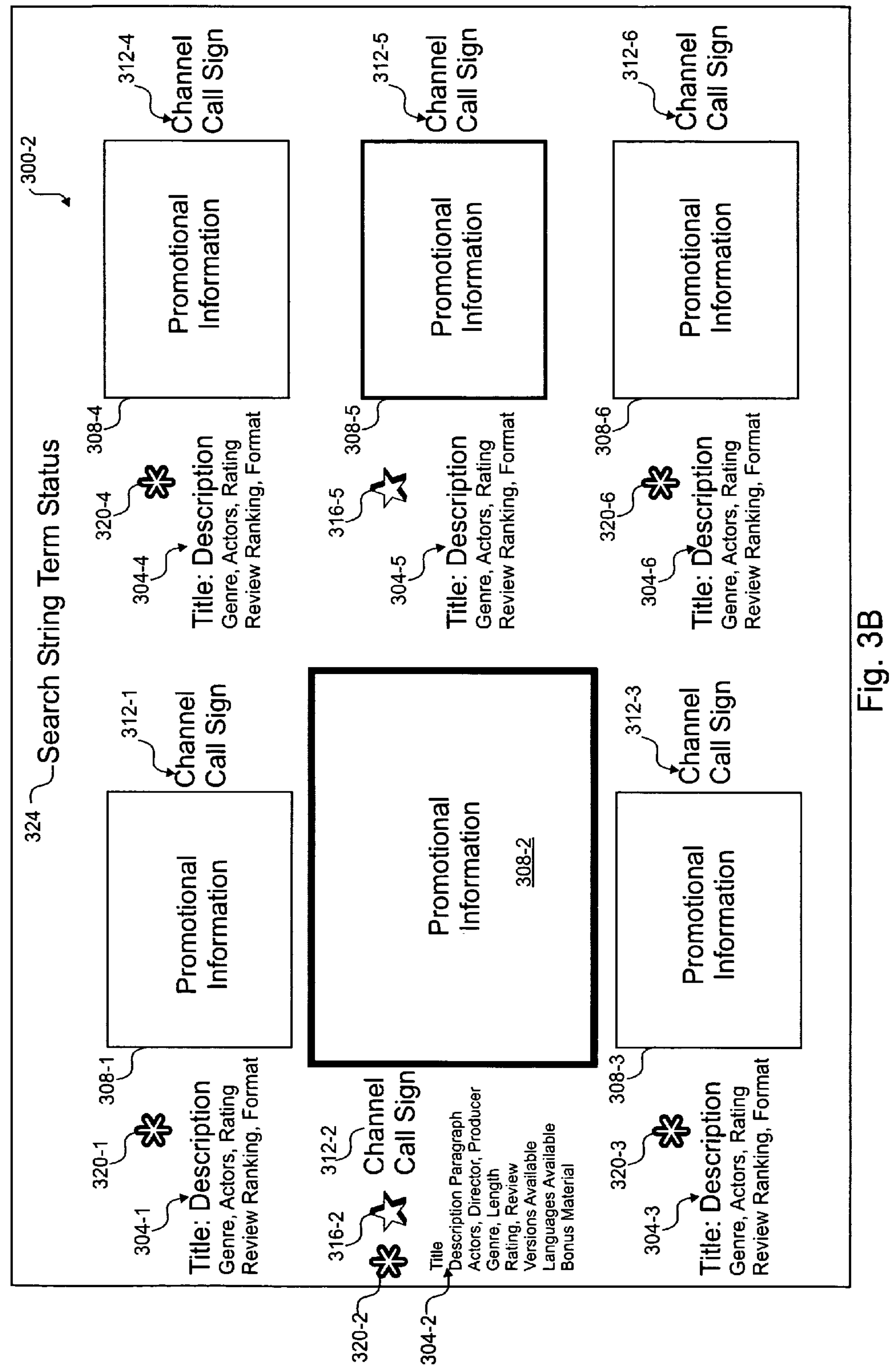

Referring next to FIG. 3B, a screen shot depicting another embodiment of a rotating video interface 300-2 showing program selections that comply with a search string 324. The search string is a natural language query or Boolean query that is used to find programs. In this embodiment, the program description 304 is more complete for the zone in focus. Each term in the program description 304 and the call sign 312 is a link that when activated adds that term to the search string status line 324. Adding terms to the search string 324 narrows or broadens the search depending on whether there is a Boolean AND or OR connector between the terms. The user can specify the default or can expressly enter the connector. In some embodiments, there may be options for selecting common search terms from one or more lists, for example, a genre selection option could be used to pick a particular genre.

Figure 4:
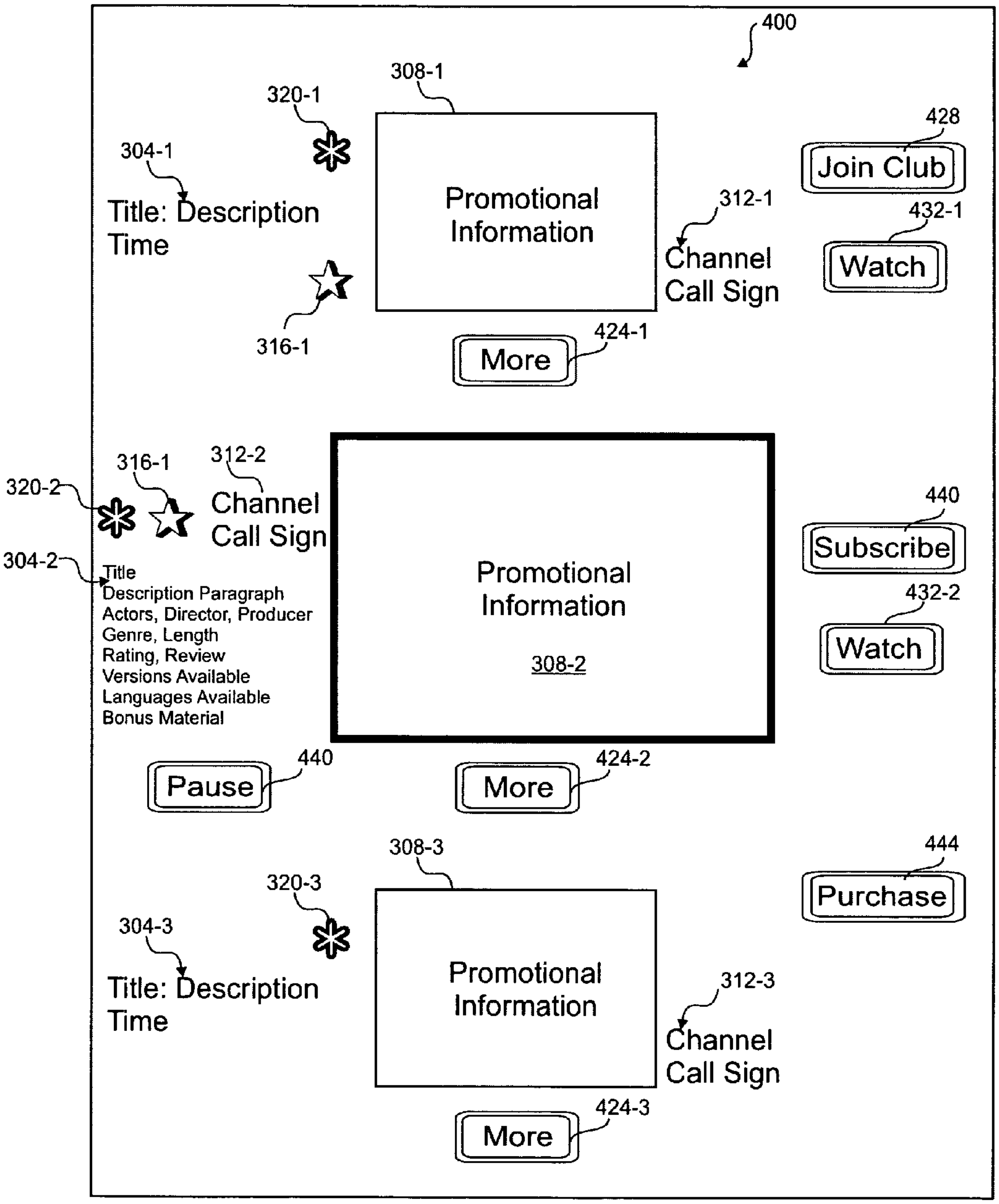
FIG. 4 is a screen shot illustrating another embodiment of a rotating video interface with promotional information in a vertically rotating carousel.

With reference to FIG. 4, a screen shot illustrating another embodiment of a rotating video interface 400 with promotional information in a vertically rotating carousel is shown. This embodiment has three zones respectively associated with three programs. Virtual buttons are provided on the screen to perform certain actions. Cursor keys, a mouse, touch screen input or the like are used to focus and select the buttons. The middle zone is always in focus for this embodiment. As focus progresses through the programs in the list the bottom or top program (depending on carousel rotation direction) becomes the middle program in focus.

In the top zone, a SVOD program is showcased as indicated by the notification symbol 316-1. The SVOD program appears in both the linear schedule and has a stored version that can be played anytime with full control of playback. The first promotional information 308-1 could be of the program being played or could be of a promo associated with the program. The live program is played by activating the "watch" button 432 when the live program is currently playing. Where the live program is not currently playing, the "watch" button 432 disappears. If the user is not a club member, a "join club" button 428 is displayed such that the user can request club membership to allow playing the program.

A live program from a premium content provider is shown in the middle zone. Premium content providers typically require a subscription to view their programs. In this embodiment, a "subscribe" button 440 is displayed for non-subscribing users to begin the process of becoming a subscriber. The "watch" button 432 allows switching the second promotional information 308-2 to live playback of the program. For non-subscribers, the live playback may be crippled in some way by limiting the time the user can watch the live show to a small period, such as five seconds; showing a slide show of frames separated in the program by some interval, such as one second; showing a reduced resolution version of the live program; showing a black-and-white version of the show; showing the show without sound; etc.

A bottom zone of the thematic menu 400 relates to a VOD offering that is stored and can be played with full control of playback. The third promotional information 308-3 shows a promotional clip of the program shown in a loop. In other embodiments, the third promotional information 308-3 could be a static image until focus is changed to the program in the third zone, whereby a promotional clip replaces the promotional information. A "purchase" button 444 begins a process whereby the user can buy a viewing of the program. After the purchase, the user may be given a window in which the program is available for viewing with control of playback, such as a one-day period, before another purchase would be required for further viewing. In some embodiments, the period could be a week, a month, a year, or an indefinite period. Instead of a "purchase" button 444, one embodiment could have a download button that would load the selection onto the program store 208.

A "more" button 424 allows getting more program information and/or more detailed promotional information 308. For example, activation of the top "more" button 424-1 would move the focus to the top program associated with that zone. Activation of the middle "more" button 424-2 could cause playback of a more detailed version of the promotional information. For example, a 5 second teaser clip could normally play as the promotional information 308-2, but activation of the "more" button 424 would activate a "making-of" video to start playing as the promotional information 308-2. Whatever is stored in the program information database 164 is available for the promotional information 308.

Figure 5:
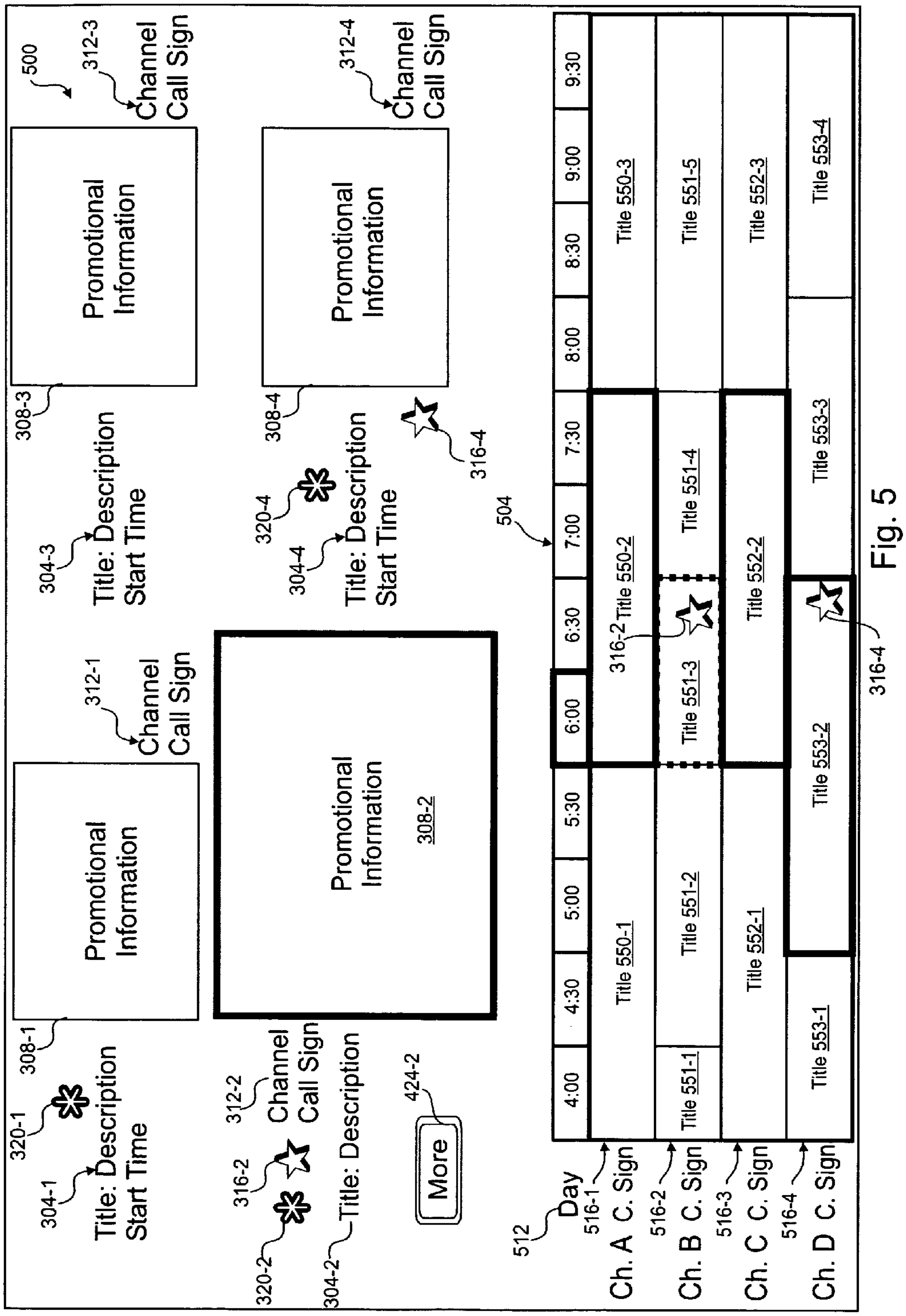
FIG. 5 is a screen shot illustrating yet another embodiment of the rotating video interface that shows a linear schedule of programs and a rotating video interface in a mosaic.

With reference to FIG. 5, a screen shot illustrating another embodiment of the rotation interface 500 showing a linear schedule of programs 504 where a column of linear programs can be selected for further information. Where a time column is selected, all the programs playing during that time are detailed in the top portion of the rotation interface 500 with promotional information 308, description information 304 and content provider information 312. In this embodiment, four channels 516 are displayed in the bottom portion of the thematic menu 500 with four detailed programs in the top portion of the rotation interface 500. Using the remote, the user may increase the number of programs detailed in the top portion and the number of channels displayed in the rotation interface 500.

This embodiment allows selecting a whole column of programs for more detailed information. Other embodiments could also allow selecting a row of programs for more detailed information such that a sequential number of programs for a given channel 516 is displayed. For example, Channel A 516-1 could be selected by focusing on the channel name. This would detail three programs in the top half of the thematic menu. Since the top half of the thematic menu screen could show one, two, four, six, or eight programs easily, selecting a channel with a number of programs between that value could increase the number of detailed programs appropriately. For example, selecting Channel B 516-2 could detail five programs in the top half of the rotation interface 500 by pulling the program that starts at 4:00 such that five programs could be detailed at once.

The channels displayed in the rotation interface 500 are chosen by the set top box 120 or video player. These channels can also be ordered. The most recently watched program, channel, a search string and/or content provider along with any user preferences influences what is displayed in the rotation interface 500. The focus is currently in the second zone, but can manually or automatically progress through all possible channels. For example, the focus could change automatically every fifteen seconds through the available channels to show promotional information or live programming for the 6:00 time slot.

Figure 6A:
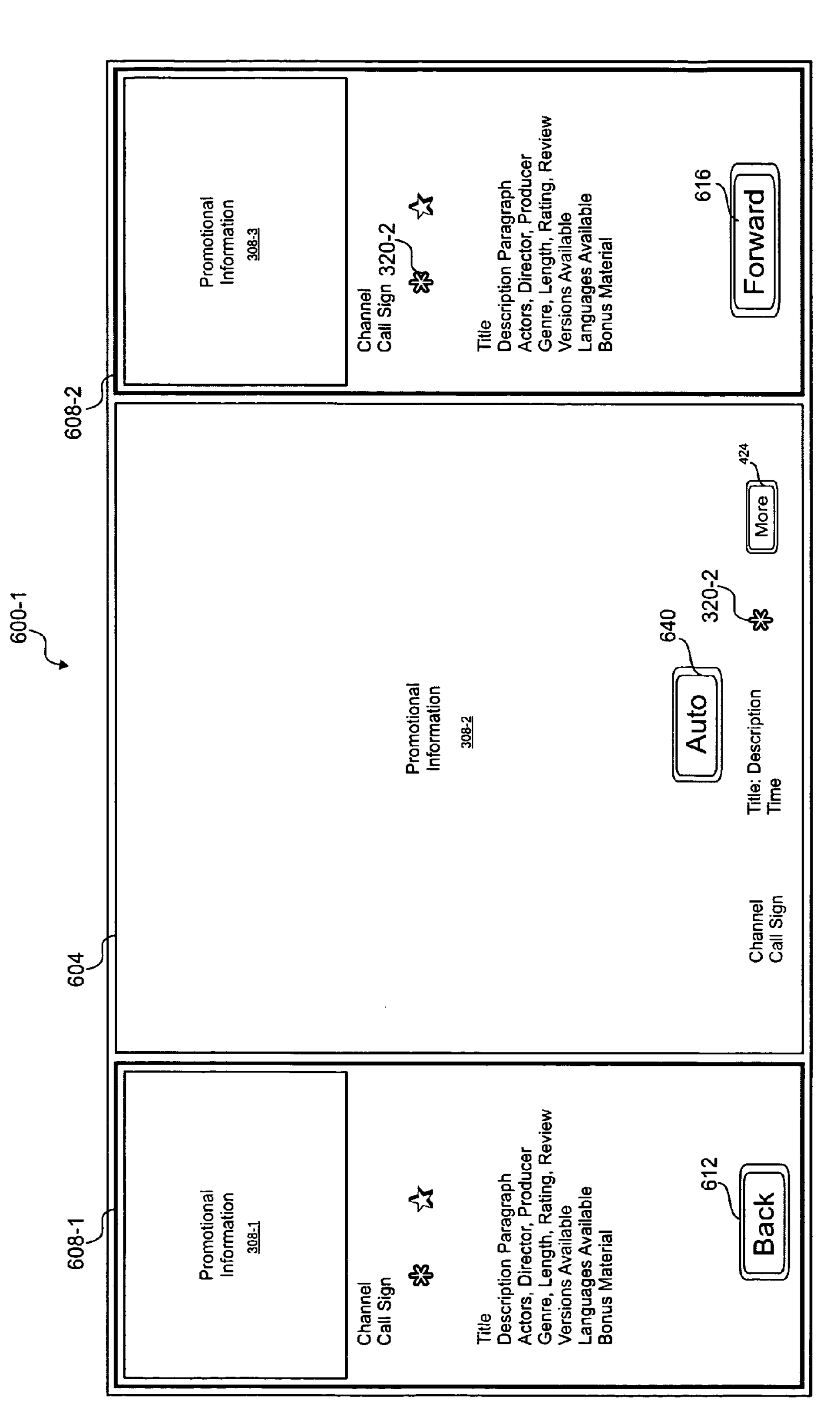
FIGS. 6A-6E are screen shots illustrating still other embodiments of a rotating video interface where the video clips rotate.

Referring next to FIG. 6A, a screen shot illustrating an embodiment of a rotating video interface 600-1 is shown where the video clips rotate according to a horizontal carousel. The middle program is currently in focus and playing a video vignette. The side zones 608 may also be playing a video vignette, showing box art, a slide show, or animation, but only the middle zone 604 would optionally have sound playing. This embodiment is currently configured to manually move between zones, but the user could activate the "auto" button 640 to begin automatic cycling. This embodiment also includes "forward" and "back" buttons 616, 612 that would manually progress through the list of programs in the carousel, but keys on the remote, for example, could also be used.

Figure 6B:
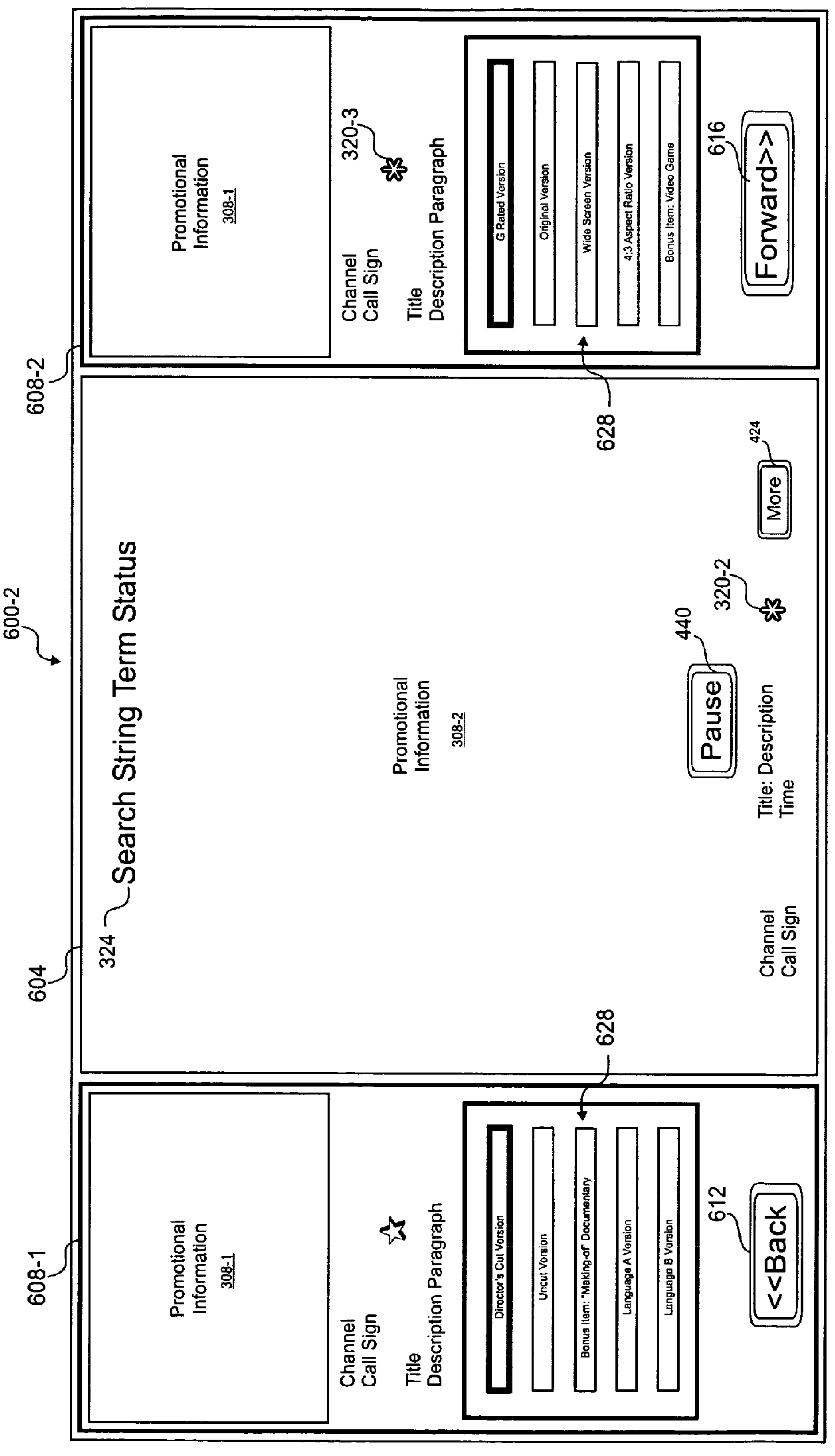

With reference to FIG. 6B, a screen shot illustrating an embodiment of a rotating video interface 600-2 is shown that includes a search string 324 and alternate version information 628. The search string 324 can be manually entered, chosen with a thematic link 320 or by selecting keywords throughout the IPG. Keywords can be removed from the search string 324 by selecting them and confirming their deletion in some embodiments. The alternate version information 628 lists all the different versions of the program available for viewing. Selection of any version would begin playback of that version if the user had purchased sufficient rights. The various versions could be stored locally, in the linear schedule and/or available on-demand. This embodiment is in automatic progression mode, but can be switched to manual by activation of the "pause" button 440.

Figure 6C:
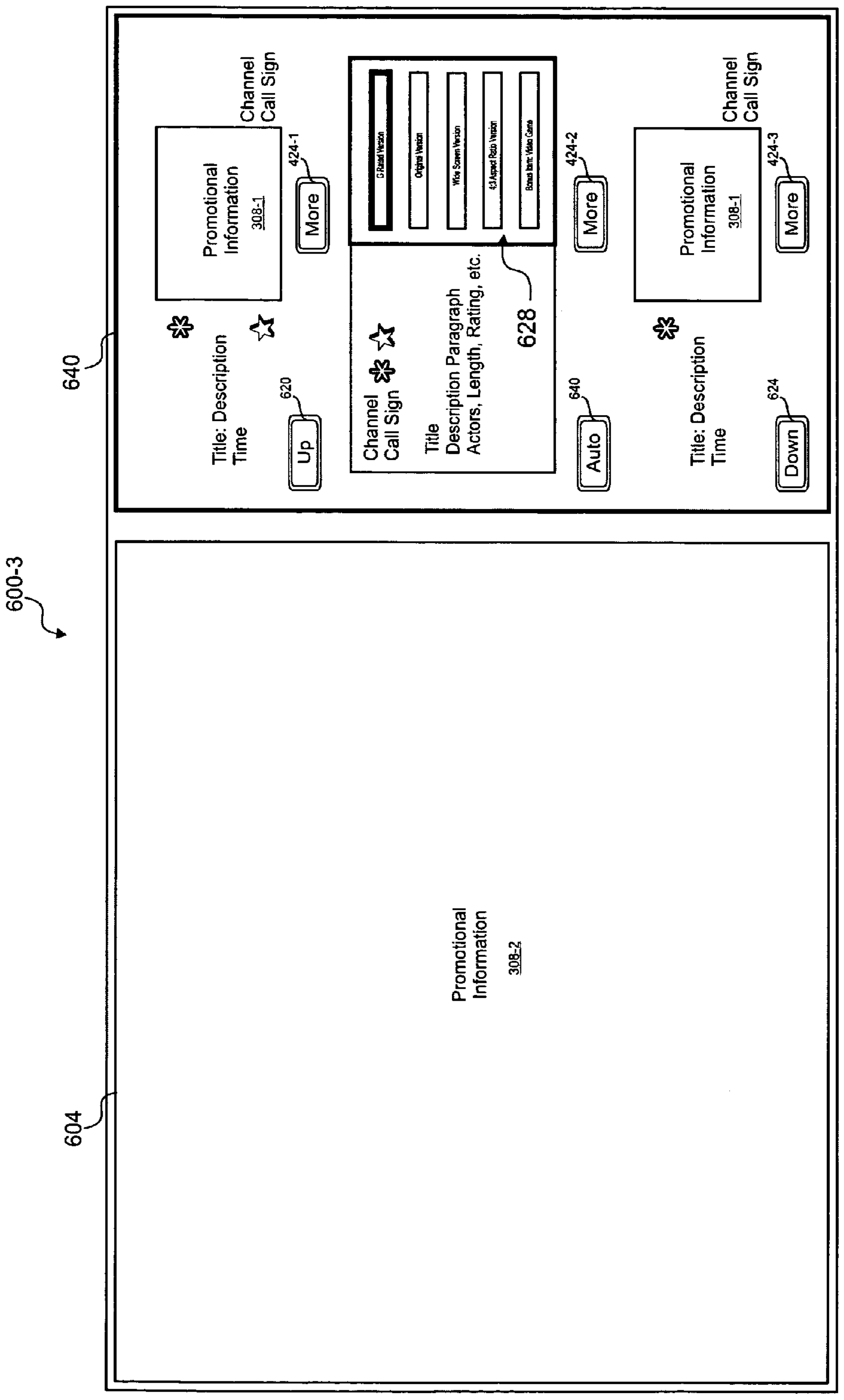

Referring next to FIG. 6C, a screen shot illustrating an embodiment of a rotating video interface 600-3 is shown where the video clips rotate according to a vertical carousel 640 and the middle zone of the carousel has a preview window 604 in focus that is shown in great detail. The middle zone of the carousel 640 is always in focus as the carousel rotates in this embodiment. The information presented for the in-focus zone is more detailed and the promotional information 308 is shown in the detailed window 604. Alternate version information 628 is shown for the in-focus zone.

Figure 6D:
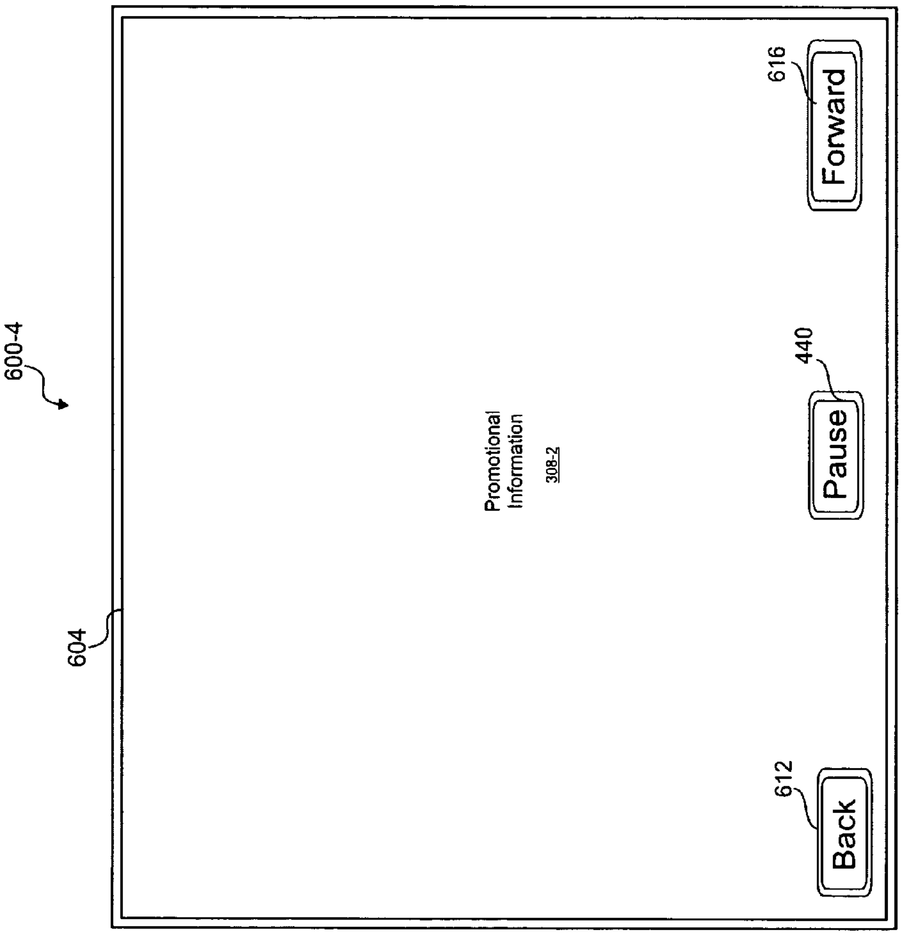

With reference to FIG. 6D, a screen shot illustrating an embodiment of a rotating video interface 600-4 is shown where the video clips rotate according to a carousel. In this embodiment, only the program currently in focus is shown. The video vignettes are played in the a single detailed window 604 in a slide-show fashion. Additional information 304, 312, 316, 320 could overlay the promotional information 308 in other embodiments. Selecting a play on the remote, when the user arrives at the desired program, would activate an alternate version information screen 628 or simply begin playback of the full-version of the program.

Figure 6E:
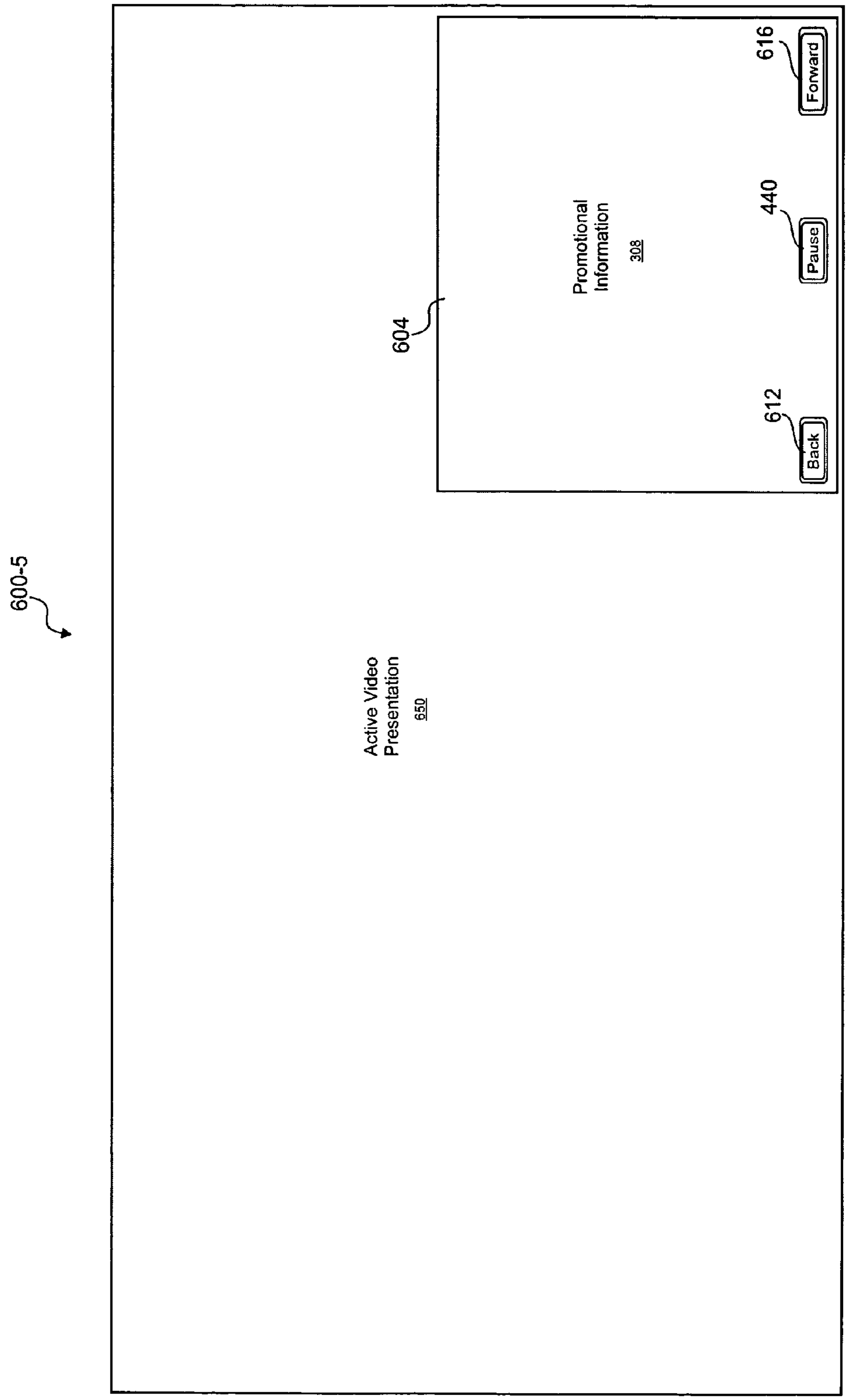

With reference to FIG. 6E, a screen shot illustrating an embodiment of a rotating video interface 600-5 is shown where the video clips rotate according to a carousel that overlays playback of another video program. An active video presentation window 650 presents a current video program, but an overlay window 604 shows video vignettes in a slideshow fashion. Activating the vignette in the overlay window 604 would activate the corresponding video program and cause it to fill the active video presentation window 650. The overlay window 604 could automatically disappear once a video program is selected for presentment. In this way, this embodiment allows a user to watch in the main window 650, while selecting the next video program to watch.

With reference to FIG. 6D, a screen shot illustrating an embodiment of a rotating video interface 600-4 is shown where the video clips rotate according to a carousel. Some embodiments allow switching the vignette slideshow to the main window 650 such that the presented program is shown in the overlay window. The placement of the overlay window can be resized and have its location moved in various embodiments.

Figure 7A:
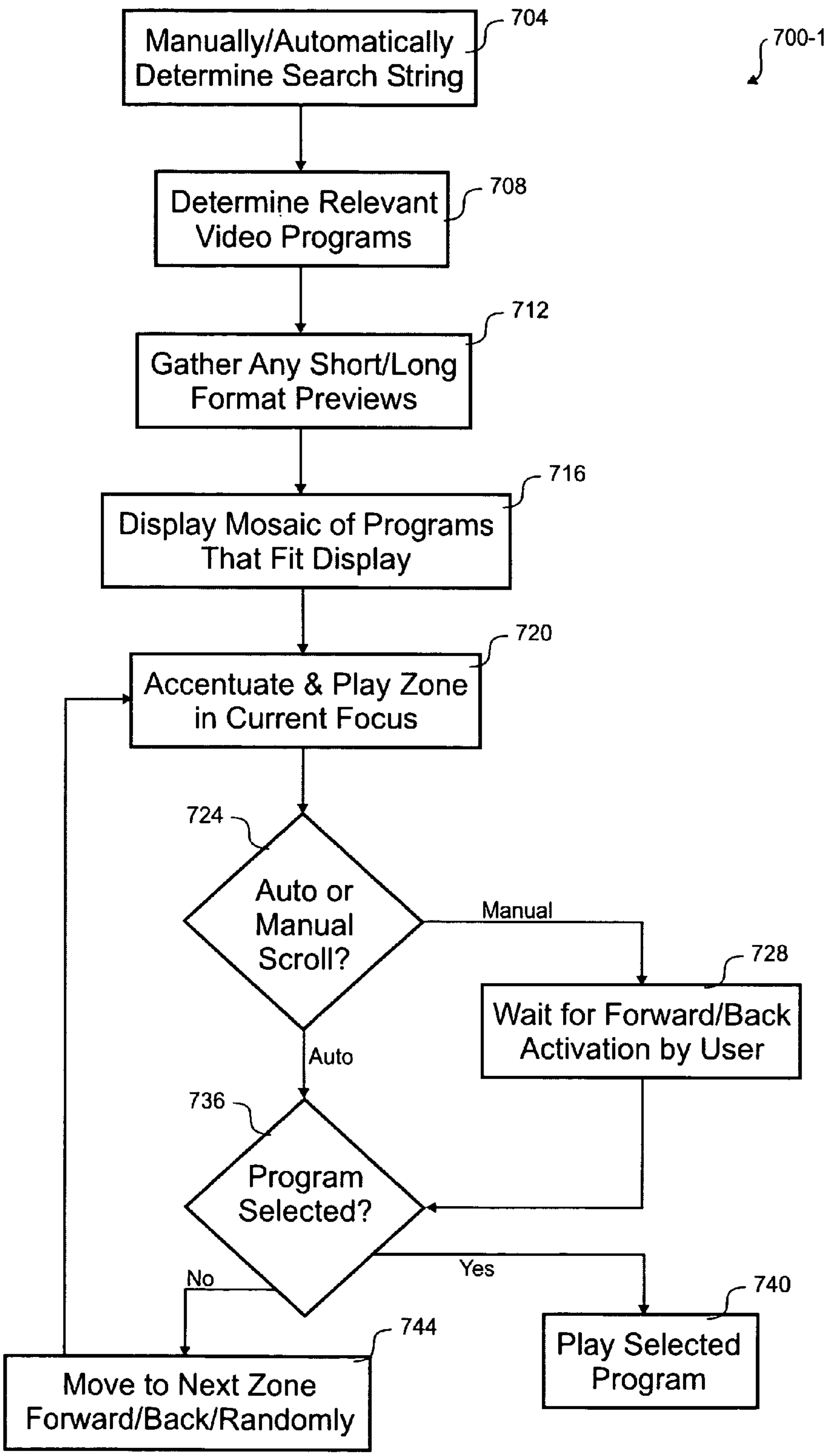
FIGS. 7A and 7B are flow diagrams of embodiments of a process for operating a rotating video interface.

Referring next to FIG. 7A, a flow diagram of an embodiment of a process 700-1 for operating a rotating video interface is shown. The depicted portion of the process begins in step 704 where a search string is determined. A profile for a user or set top box could be used to automatically suggest the programs to include in the search. A search is performed based upon the criteria in step 708. Available for customization by the user, the search can be limited to categories of programs such as on-demand, linear schedule or stored programs in some embodiments. The various sized promotional clips 308 are gathered in step 712. The user can specify which size or type of promotional clips 308 and then use a "more" or "less" button to switch between them as they are played.

This embodiment uses a mosaic of programs found in the search, but other embodiments could use a vertical or horizontal carousel. The mosaic is displayed in step 716. The zone currently in focus is accentuated with additional information in some embodiments and the promotional information 308 is played in step 720. If the scrolling between selections is manual as determined in step 724, processing continues to step 728 where playback continues until the user indicates that the focus should progress to the next program. The promotional information 308 could play in a loop or just play once while waiting. In one embodiment, all the available promotional information 308 is played while waiting. This information could repeat or just stop when complete. For example, a 5 second teaser could play, a theatrical trailer could play next, a "making-of" documentary, and finally ending with the box art being shown.

Where the scrolling between programs is automatic or where the user requests progression in step 728, processing continues to step 736 where the in-focus program may be selected. Where the user does select playback, that program is played in step 740. If scrolling is indicated, the next zone is selected in step 744 before looping back to step 720 for playback of the promotional information 308. The movement between zones can be alphabetical, by relevance, by popularity, by cost, according to user preference, be random, or a combination of these factors in various embodiments.

Figure 7B:
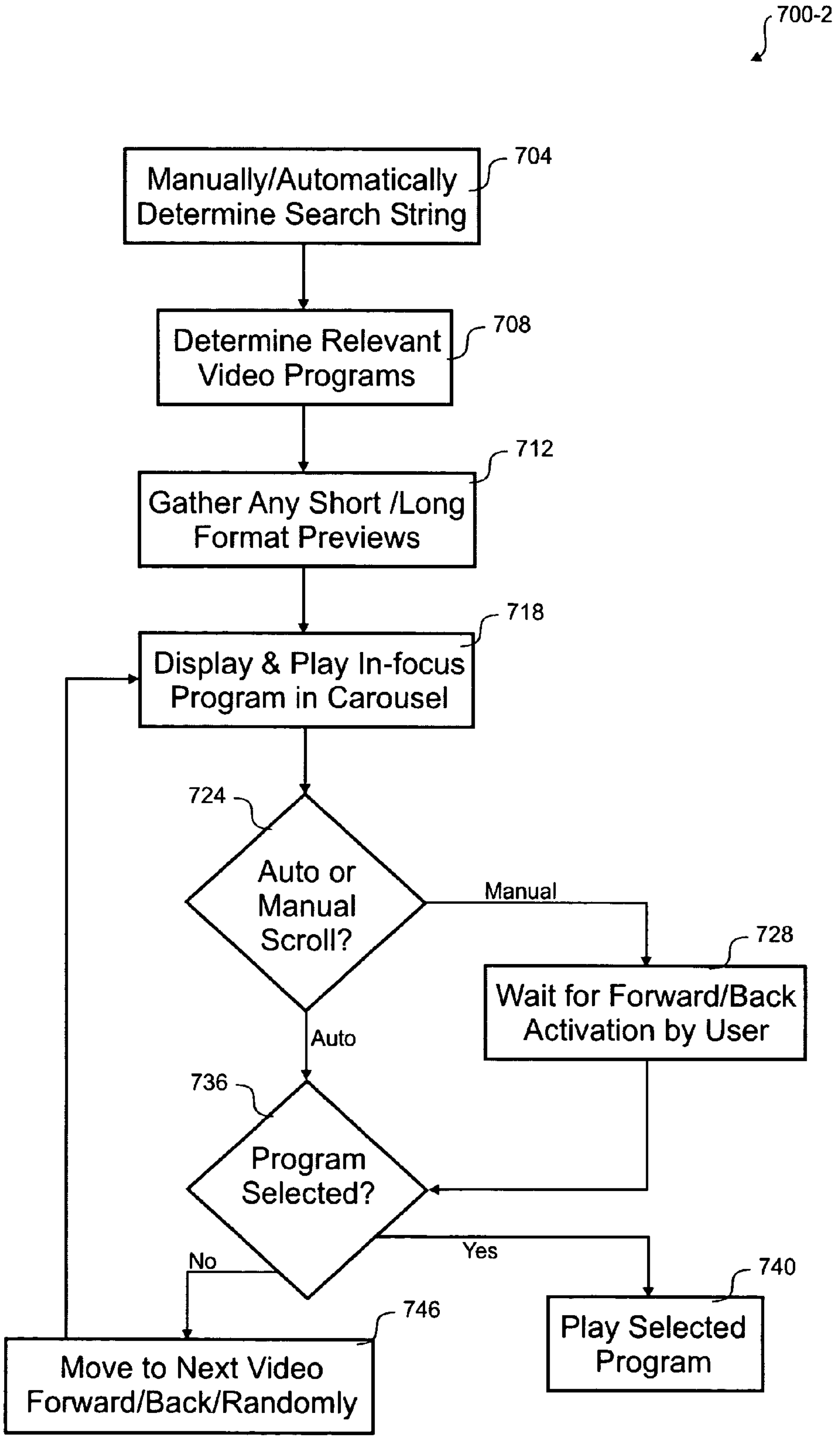

With reference to FIG. 7B, a flow diagram of an embodiment of another process 700-2 for operating a rotating video interface is shown. This embodiment replaces steps 716 and 720 with step 718. This embodiment uses a display like that shown in FIG. 6D where only the in-focus program is shown on the screen without other zones. In step 718, that program in the carousel currently in-focus has its promotional information 308 played.

Figure 8A:
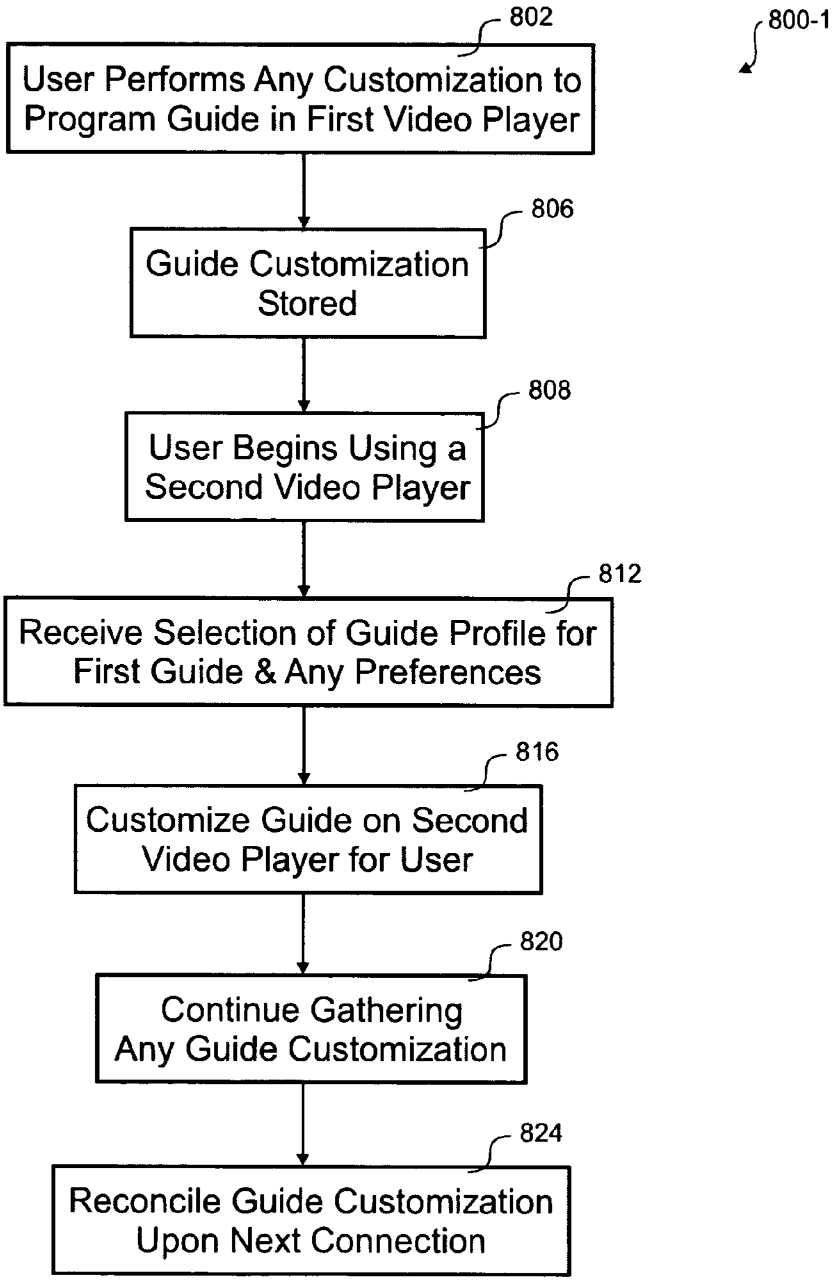
FIGS. 8A and 8B are flow diagrams of embodiments of a process for consistent interfaces across various video players.

Referring next to FIG. 8A, a flow diagram of an embodiment of a process 800-1 for consistent interfaces across various video players 122 is shown. An IPG profile allows the user to interact in similar ways with most video players 122 or set top boxes 120. The depicted portion of the process begins in step 802 where any customization of the IPG is performed by the user when interacting with the first video player. That IPG customization is stored in the preference database 160. Those customizations may also be uploaded to a remote repository that is available to the second video player such that the changes can propagate forward.

In step 808, the user begins interacting with a second video player 122. The IPG profile is retrieved after the first video player is identified. The IPG profile is stored in custom guide database 162, which is either local or remote to the video player 122. The preferences may be available by coupling the first and second video players 122 together directly or by exchanging the information over a wide area network. In step 816, the IPG is customized for the second video player 122. These changes may be reversible after the user is finished with the interaction.

In step 820, customization is gathered for the user on the second video player 820. That customization can be reconciled such that it propagates back to the first video player 820. Examples of how this might be used include a cable TV customer that also has TV service on their cell phone could have a consistent IPG between the two devices. The cell phone could gather customizations from a data channel back to the headend 124 of the cable TV provider.

Figure 8B:
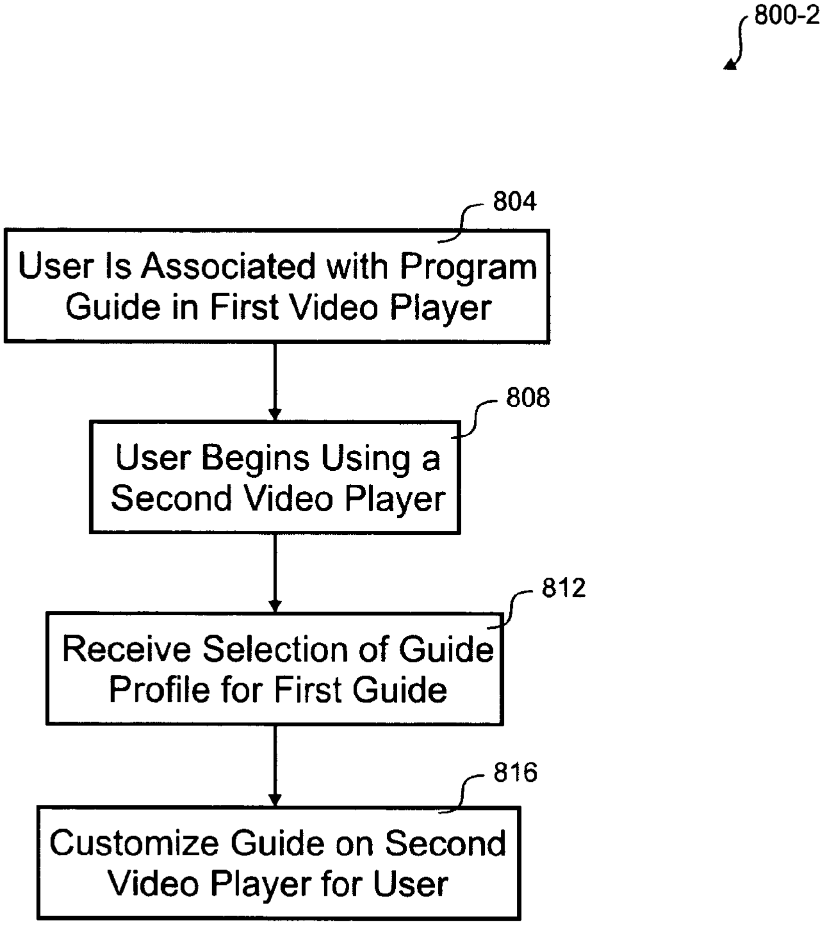

With reference to FIG. 8B, a flow diagram of another embodiments of a process 800-2 for consistent interfaces across various video players 122 is shown. This embodiment includes new step 804 and steps 808, 812 and 816 performed in that sequence and does not include any customization capability or reconciling preferences. In step 804, the user is associated with an IPG for a first video player. Information on that first video player is communicated to the second video player to allow loading the appropriate IPG profile. For example, step 808 could include asking the user about the IPG for their first video player such as the cable TV provider, their address, their options ordered, etc.

In one embodiment, the rotation interface automatically rotates through live television. Where the video player or set top box has dual tuners, a first tuner is used to display a first video program, a second tuner is used to display a second video program, the first tuner is used to display a third video program. This toggling between tuners allows quicker switching between video programs, which is especially evident in compressed digital video streams, but can also be used for analog video streams. Where only one of two tuners is currently available, the video player could return to using a single tuner to change channels.

While the principles of the disclosure have been described above in connection with specific apparatuses and methods, it is to be clearly understood that this description is made only by way of example and not as limitation on the scope of the invention.

What is claimed is:

1. A program delivery system for playing a plurality of video vignettes, which correspond to a plurality of video programs, the program delivery system comprising:

a first store for storing a plurality of video programs, wherein:
- the plurality of video programs includes a first video program and a second video program, and
- each of the plurality video programs are each individual programs with a single beginning and a single end;

a second store for storing a plurality of video vignettes that correspond to the plurality of video programs, wherein:
- the plurality of video vignettes includes:
  - a first video vignette,
  - a second video vignette, and
  - a third video vignette,
- the first video vignette is created automatically by the program delivery system from a stored version of the first video program,
- the first video vignette promotes the first video program,
- the second video vignette promotes the second video program,
- the second video vignette is specific to the second video program;
- the second video vignette comprises a program trailer for the second video program, the third video vignette also promotes the second video program, the third video vignette is specific to the second video program, and the third video vignette comprises a making-of clip for the second video program, a search command that uses a search string to search a plurality of video programs, wherein search results include at least the first video program and the second video program;

a first command signal that causes playing the first video vignette;

a second command signal that is that is generated both when a manual command is received from a user and whenever a triggering event occurs, wherein:

the triggering event comprises at least one selection from a group consisting of:

a video vignette ending playback, and a time period expiring, the second command signal causes focus to switch from the first video vignette to the second video vignette by rotating a vertical or horizontal carousel, a first display area of the first video vignette is decreased and a second display area of the second video vignette is enlarged when focus is switched from the first video vignette to the second video vignette; and the third video vignette replaces the second video vignette in the second display area when the second video vignette ends without requiring rotation of the vertical or horizontal carousel; and an interactive program guide (IPG) screen displaying information on the first video program while the second video program is playing.

2. The program delivery system for playing the plurality of video vignettes as recited in claim 1, wherein the first video vignette is stored in a media player at a location of the user, and wherein a length of the first video vignette is based on a storage capacity of the media player.

3. The program delivery system for playing the plurality of video vignettes as recited in claim 1, wherein the plurality of video programs are chosen from at least one of linearly scheduled programs, programs stored local to the user location, or on-demand programs.

4. The program delivery system for playing the plurality of video vignettes as recited in claim 1, wherein the first store and second store are stored on a same storage media.

5. A method for playing a plurality of video vignettes, which correspond to a plurality of video programs, the method comprising:

determining the plurality of video programs, wherein:

the plurality of video programs include a first video program and a second video program, and each of the plurality video programs are each individual programs with a single beginning and a single end;

determining the plurality of video vignettes corresponding to the plurality of video programs, wherein:

the plurality of video vignettes includes:

a first video vignette, a second video vignette, and a third video vignette, the first video vignette promotes at least the first video program, the second video vignette promotes the second video program, the second video vignette is specific to the second video program;

the second video vignette comprises a program trailer for the second video program, the third video vignette also promotes the second video program, the third video vignette is specific to the second video program, and the third video vignette comprises a making-of clip for the second video program, playing the first video vignette;

switching from playing the first video vignette to playing the second video vignette when at least one of the following steps is performed:

detecting a manual command by a user, or detecting a triggering event that automatically occurs;

switching from playing the second vignette to playing the third video vignette; and displaying an interactive program guide (IPG) screen with information on the first video program while the second video vignette is playing;

wherein the switching comprises a step of rotating focus from the first video vignette to the second video vignette according to a vertical or horizontal carousel, and further wherein rotating focus from the first video vignette to the second video vignette comprises enlarging a first display area of the second video vignette and decreasing a second display area of the first video vignette, and wherein the third video vignette replaces the second video vignette in the first display area.

6. The method for playing the plurality of video vignettes as recited in claim 5, wherein the first video vignette is stored in a media player at a location of the user.

7. The method for playing the plurality of video vignettes as recited in claim 5, wherein the first-listed determining step comprises a step of:

determining a search criteria; and applying the search criteria to a larger group of videos to cull out the plurality of video programs.

8. The method for playing the plurality of video vignettes as recited in claim 5, wherein the plurality of video programs is chosen from at least one of linearly scheduled programs, programs stored local to the user location, or on-demand programs.

9. The method for playing the plurality of video vignettes as recited in claim 5, wherein the triggering event is at least one of:

a video vignette ending playback, or a time period expiring.

10. The method for playing the plurality of video vignettes as recited in claim 5, wherein the manual command is at least one of:

activation of a remote control button, or selection by navigation within the IPG.

11. A non-transitory computer-readable storage medium having computer-executable instructions for performing the computer-implementable method for playing the plurality of video vignettes of claim 5.

12. A computer system adapted to perform the computer-implementable method for playing the plurality of video vignettes of claim 5.

13. A method for playing a plurality of video vignettes, the method comprising steps of:

determining a plurality of video programs, wherein the plurality of video programs includes first and second video programs;

determining the plurality of video vignettes corresponding to the plurality of video programs, wherein:

the plurality of video vignettes includes first and second and third video vignettes, the first video vignette promotes at least the first video program, at least the first video vignette is created automatically from the first video program, each of the plurality video programs are each individual programs with a single beginning and a single end, the second video vignette promotes at least the second video program and is specific to the second video program; and the second video vignette promotes the second video program;

the second video vignette is specific to the second video program;

the second video vignette comprises a program trailer for the second video program;

the third video vignette also promotes the second video program, the third video vignette is specific to the second video program, and the third video vignette comprises a making-of clip for the second video program, searching the plurality of video programs by entering a search string;

determining search results based on the search string, wherein the search results include at least the first video vignette;

playing the first video vignette;

switching from playing the first video vignette to playing the second video vignette, wherein the switching comprising rotating focus from the first video vignette to the second video vignette according to a vertical or horizontal carousel, and further wherein rotating focus from the first video vignette to the second video vignette comprises enlarging a first display area of the second video vignette and decreasing a second display area of the first video vignette; and switching from playing the second video vignette to playing the third video vignette, wherein the switching comprises the third video vignette replacing the second video vignette in the first display area.

14. A non-transitory computer-readable storage medium having computer-executable instructions for performing the computer-implementable method for playing the plurality of video vignettes of claim 13.

15. A computer system adapted to perform the computer-implementable method for playing the plurality of video vignettes of claim 13.

16. The program delivery system for playing the plurality of video vignettes as recited in claim 1, wherein playback of the first video vignette and the second video vignette partially overlays playback of a video program.

17. The method for playing the plurality of video vignettes as recited in claim 13, wherein the search results include the second video vignette; and switching from playing the first vignette to playing the second vignette when a triggering event that automatically occurs is detected.

18. The program delivery system for playing the plurality of video vignettes as recited in claim 1, wherein:

the first display area of the second video vignette is configured to be centered on a display screen;

the first display area of the second video vignette is configured to span a vertical height of the display screen; and the second display area of the first video vignette is configured to be disposed to one side of the first display area.

19. The method for playing the plurality of video vignettes as recited in claim 13, the method further comprising the steps of:

determining a plurality of tuner resources;

determining a plurality of live programs corresponding to video programs in the plurality of video programs;

determining that there are more live programs in the plurality of live programs than tuner resources; and cycling the tuner resources through the plurality of live programs to generate a clip for each of the plurality of live programs.

20. The program delivery system for playing the plurality of video vignettes as recited in claim 1, further comprising:

an output signal that causes the display of a notification symbol, wherein:

the notification symbol is associated with the first video vignette; and the notification symbol indicates that the first video program is available for live playback.

* * * * *